INVENTOR.
FRED J. BUCHER
BY
William D. Carothers
HIS ATTORNEY.

Feb. 12, 1952  F. J. BUCHER  2,585,734
LEAKAGE INDICATOR AND PROTECTIVE EQUIPMENT FOR
DIRECT CURRENT DISTRIBUTING CIRCUITS
Filed Jan. 2, 1948  3 Sheets-Sheet 2
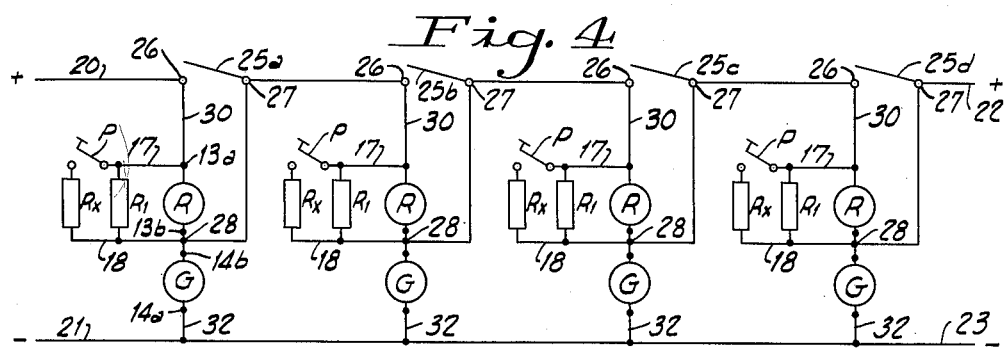
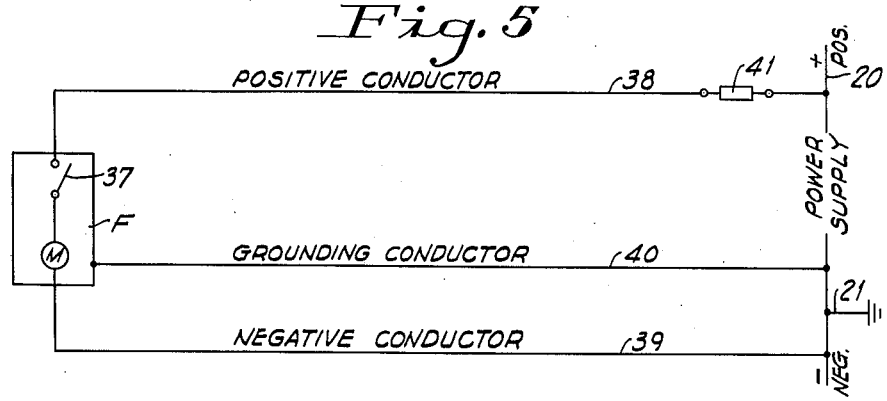
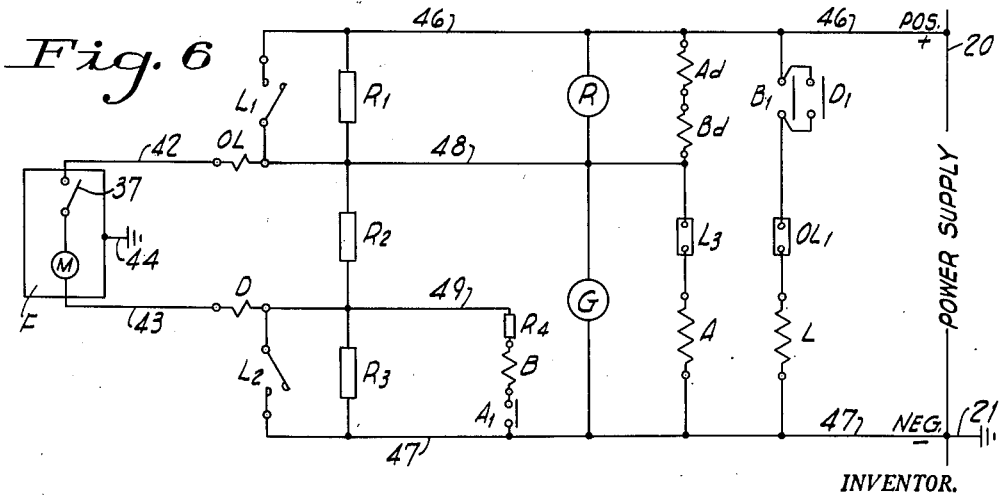
INVENTOR.
FRED J. BUCHER
BY
HIS ATTORNEY.

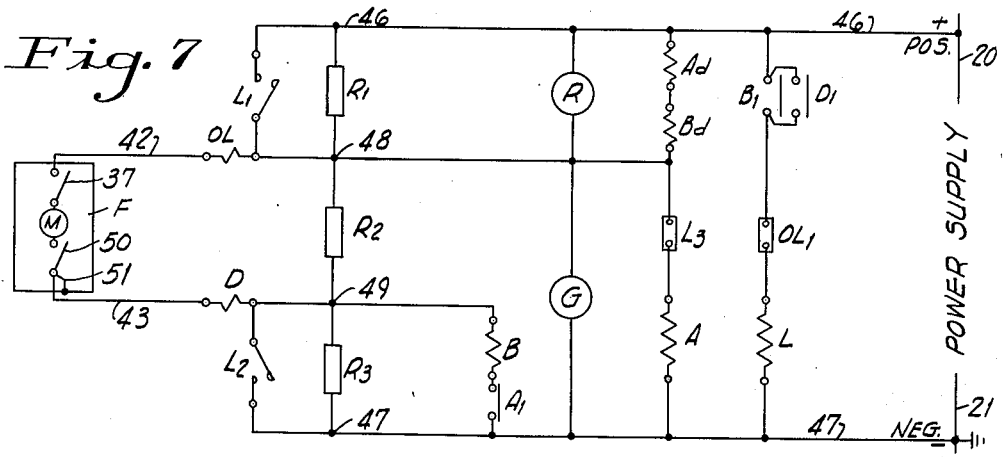
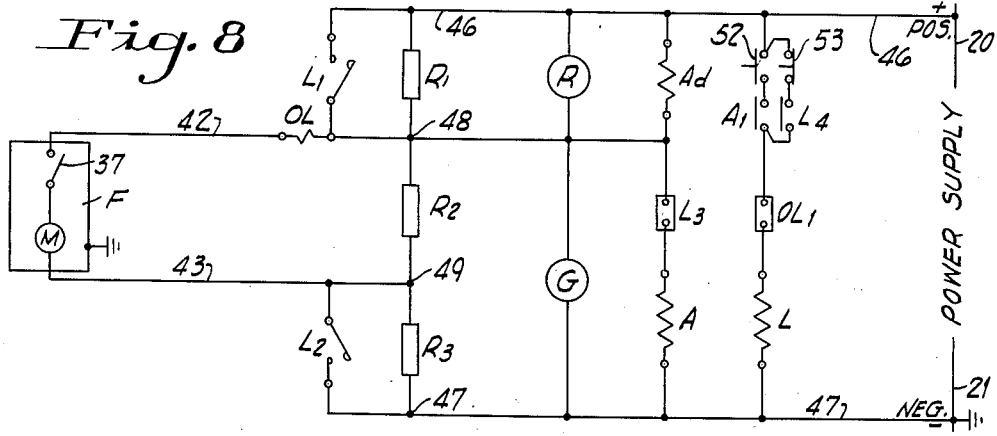
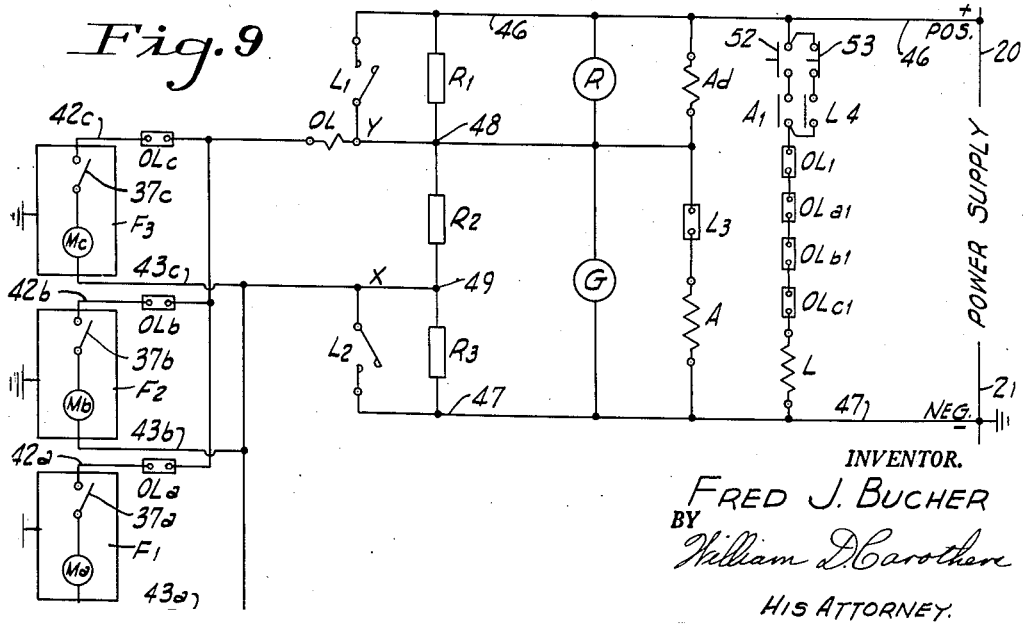
INVENTOR.
FRED J. BUCHER
BY
*William D. Carothers*
HIS ATTORNEY.

Patented Feb. 12, 1952

2,585,734

UNITED STATES PATENT OFFICE 2,585,734

LEAKAGE INDICATOR AND PROTECTIVE EQUIPMENT FOR DIRECT CURRENT DISTRIBUTING CIRCUITS

Fred J. Bucher, Library, Pa.

Application January 2, 1948, Serial No. 218

9 Claims. (Cl. 177—311)

1

This invention relates generally to electrical indicating and protective circuits and more particularly to method and apparatus for protecting equipment and branch feed lines in direct current power distributing circuits.

Direct current power distributing circuits, such as employed in coal mines, must sometimes function under extreme conditions of dampness. The feeder lines are roughly used and are frequently extended or shifted as the coal is removed from sections or working places which move progressively away from or towards the portal of the mine. The insulation of the feeder lines sometimes fails at the wire supports. Careless installation procedure may cause the wires to touch timbers, door frames or the roof and walls of the mine, also falls of roof may cause the feeder wires to break and lie on the ground causing leakage and fire hazards. Although there are many different causes for line failures the majority of such failures first produce a leakage of current, which steadily grows in quantity until an actual short or severance of the line occurs. If the leakage from the distributing lines is detected before it reaches a serious or hazardous condition it can ordinarily be repaired to prevent fire or destruction of equipment or feeder lines.

Another problem in a direct current distribution system is the protection of the equipment as well as the feeder lines when a failure or ground occurs in the equipment connected to the distribution system before it is operated. If the equipment develops a short during use the overload relays should function to cut it out of the circuit before the equipment is materially damaged. However, if the short occurred between periods of its connection for operation or if the equipment was connected by one who did not realize the short was present then such connection might further damage the equipment or the feeder lines.

Although these problems have long been present the only protective measures available are circuit breakers with overload operating circuits that function to disconnect the whole of the feeder circuit or branch circuits and such protection will not function on a leakage but requires an actual breakdown before it is brought into service.

The principal object of this invention is the provision of method and apparatus for indicating and protecting equipment in direct current distributing circuits against current leakage.

2

Another object is the provision of method and apparatus for providing visual indication of current leakage in a direct current distributing system.

Another object is the provision of an electrical circuit which prevents the connection of equipment to a direct current distributing system when the equipment or load and the distribution line contains a current leakage.

Another object of this invention is the provision of a dual indicating and protective circuit for use in a direct current distributing system that indicates possible failure due to current leakage and prevents the operation of the equipment normally connected therewith.

Another object is the provision of a control circuit which will selectively connect or prevent the connection of the equipment to a direct current distributing circuit depending upon the current leakage in the equipment and the lines connected thereto.

Another object is the provision of a control circuit for preventing the connection of a plurality of machines to a direct current distributing circuit if a current leakage occurs in any one of the machines or the electrical feed lines connected therewith.

Other objects and advantages appear hereinafter in the following description and claims or may be evident from the disclosure of the circuits in the drawings.

A practical embodiment illustrating the principles of this invention is shown on the accompanying drawings wherein:

Fig. 4 is a circuit diagram illustrating the use of a series of indicating circuits in a single feeder line;

Fig. 5 is a circuit diagram of the ordinary practice employed in connecting direct current machinery to a distribution circuit;

Fig. 6 is a circuit diagram of an indicating and protective circuit comprising this invention as employed with a single pole machine operating switch;

Fig. 7 is a view similar to Fig. 6 for use with the double pole operating switch;

Fig. 8 is a circuit diagram of an indicating and protective circuit having single motor normally energized by remote control; and Fig. 9 is a diagrammatic circuit illustrating a plurality of motors arranged to be operated and protected by the indicating and protective circuit comprising this invention.

Figure 1:
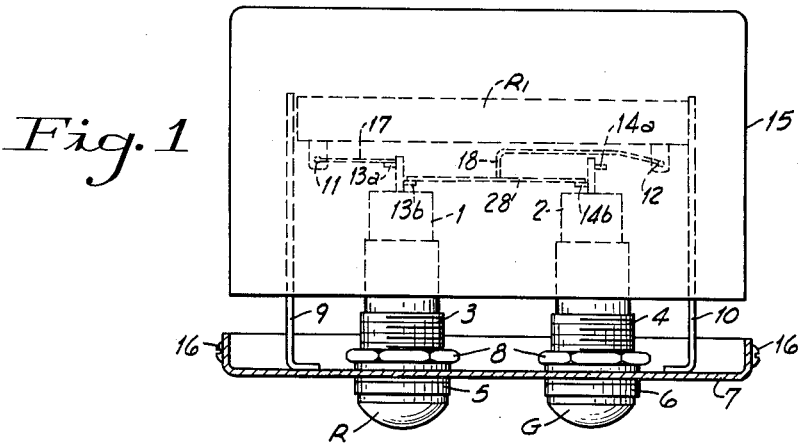
Fig. 1 is a view principally in section illustrating the arrangement of the visual indicators comprising this invention.

Referring to Fig. 1, the visual indicator of current leakage is displayed by use of the electric lamps R and G which are mounted in the sockets 1 and 2 respectively that are connected at their outer ends by the threaded sleeves 3 and 4 arranged to pass through openings in the lid 7 and having outer shoulders 5 and 6 engaging therewith. Each of the threaded sleeves 3 and 4 are secured to the lid 7 by means of the nuts 8. The outer end of the threaded sleeves 3 and 4 are arranged to retain in clamped relation the colored lens, the lens R being red and the lens G being green and further reference to these indicating lamps R and G will be noted by the letters in Fig. 1.

The under side of the lid 7 is provided with a plurality of rearwardly extending brackets 9 and 10, the inner ends of which are arranged to support the resistor $R_1$ provided with the terminals 11 and 12. The terminals of the lamps R and G are indicated at 13a, 13b and 14a, 14b respectively. The terminal 11 of resistor $R_1$ is connected by means of the wire 17 to the terminal 13a of the lamp R and the terminal 12 of the resistor $R_1$ is connected by means of the wire 18 to the wire 28 or the common connections between the terminals 13b and 14b of the indicating lamps R and G. The case or box 15 is arranged to receive the resistor and the inner ends of the two lamps R and G together with their sockets and when placed in assembled telescopic position the lid 7 may be secured to the box 15 by means of the screws 16 carried by the lid.

Figure 2:
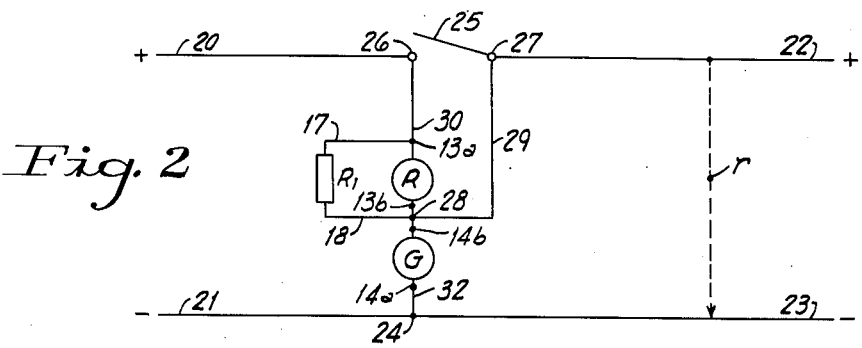
Fig. 2 is a simplified circuit diagram illustrating the application of this invention to provide visual indication only.

As illustrated in Fig. 2 the direct current power line, which is supplied from a suitable source of energy, is carried through the mine and consists of the positive line 20 and the negative line 21. This line may be carried along one of the entries of the mine and at certain positions it is desired to run a branch line into a butt entry or room consisting of the positive line 22 and the negative line 23. The negative or ground lines 21 and 23 have a solid connection with each other as indicated at 24. However, the positive line is ordinarily disconnected by means of the switch 25 which connects between the pole 26 attached to the positive line 20 and the pole 27 attached to the positive line 22. The common connection between the lamps R and G is indicated in Fig. 2 at 28, to which is connected one end of the resistor $R_1$, which line is also connected by the wire 29 to the pole 27. The other end of the resistor $R_1$ is connected by means of the wire 17 to the other end 13a of the lamp R. The common connection 28 is connected by means of the wire 29 to the pole 27 and the other end 13a of the lamp R is connected by means of the wire 30 to the positive line 20. The other side or terminal 14a of the lamp G is arranged to be connected by means of the wire 32 to the point 24 in the negative or ground connection between the lines 21 and 23.

With the structure shown in Fig. 2 the resistor $R_1$ is properly selected and the lamps R and G will glow with equal half brilliancy if no leakage or heavy load occurs between the feeder lines 22 and 23. When the switch 25 is closed to place the full potential on the positive feeder line 22, it will be noted that the switch 25 parallels the circuit through the lamp R and resistor $R_1$ and being of materially low resistance the lamp R will be extinguished and the green lamp G will glow at full brilliancy.

Let it be assumed that the switch 25 is open and the dotted line $r$ between the positive line 22 and the negative line 23 indicates the current leakage from the positive line to ground somewhere along the system. If the electrical resistance in ohms of this leakage path $r$ is equal to that of the measuring or pilot resistance $R_1$ then the potential across each of the lights R and G is equal to one-half of the full line potential and both lights glow with equal half brilliancy thus placing half line potential on the feeder line 22.

If the ohmic resistance of the leakage resistance $r$ is greater than that of the selected resistance $R_1$ the potential across the light G will be greater than the potential across the light R, and the former will glow at a higher brilliancy than the latter. If, on the other hand, the ohmic resistance of the leakage $r$ is less than that of the selected resistor $R_1$ the potential across the light G will be lower than the potential across the light R and the latter will glow with the greatest brilliancy. Thus, the difference in the brilliancy between the lights R and G is a measure of the difference between the resistance of the leakage path $r$ and the pilot or selected resistance $R_1$.

If the leakage resistance $r$ reaches or surpasses the danger point by becoming increasingly less the red light R glows with a virtually full brilliancy and the green light G becomes barely visible or may even vanish entirely owing to the low resistance of the leakage path $r$.

The voltage and wattage rating of the indicating lights R and G are chosen to suit the particular power circuit with which the detector is to be used. In a 275 volt direct current mine power distributing circuit the red light R and the green light G may be 6 watt 115 volt lamps, in which case these lamps must be used in series with a 4,000 ohm 10 watt resistor. Otherwise a 275 volt lamp of low wattage can be employed.

Figure 3:
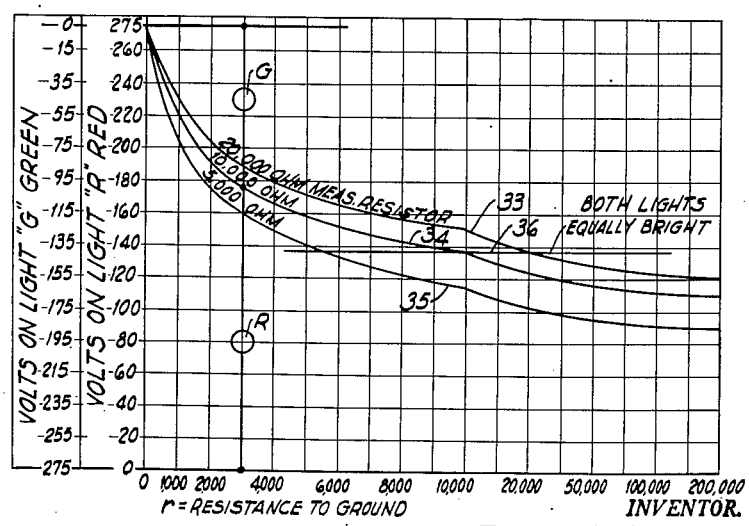
Fig. 3 is a graph illustrating the selection of resistance employed for use in the indicating circuits and protective circuits comprising this invention.

The pilot or selected resistor $R_1$ is graphically shown in Fig. 3 and illustrates the variation of voltages across the red light R and the green light G. These variations in voltages are plotted with the resistance from the positive to the negative or ground and show three curves 33, 34 and 35 for three values of resistance which are namely 20,000 ohms, 10,000 ohms, and 5,000 ohms respectively with the voltage across the red and green lights as the ordinates and the resistance to ground as the abscissas of the graph.

If the resistance of the positive direct current distribution circuit falls to 1,000 ohms the voltage across the red light using a 5,000 ohm resistor will be approximately 200 volts, which will cause this lamp to glow at near full brilliancy and the corresponding voltage across the green light will be approximately 75 which of course is an insufficient voltage to create any light whatsoever on a 275 volt lamp. If either the 10,000 or 20,000 ohm resistor is employed the voltage across the red light is of course correspondingly increased as illustrated on the graph of Fig. 3. Thus, when a circuit in a mine develops a leakage to ground, although such leakage is insufficient to segregate that section of the line by operating the overload control of a circuit breaker, nevertheless the brilliant red light R will indicate to an observer that a leakage occurs and should be repaired before that feeder or that portion of the distributing circuit is used or fails in service.

When the resistance of the leakage $r$ to ground is equal in value to the selected resistor $R_1$ the voltage curve, illustrated in the graph of Fig. 3, flattens out and the red light R remains visible or substantially equal in brilliancy to that of the green light even when the leakage resistance $r$ is extremely high. The straight line 36 in the graph of Fig. 3 illustrates the point at which the voltage on both the red light R and the green light G is equal and the lights should be of equal brilliancy. However, when the leakage resistance $r$ approaches the dangerous condition the red light R becomes increasingly bright and it is obvious to any person observing the same that the circuit should be checked before used.

Owing to the fact that the actual resistance of the leakage path $r$ is of no particular interest so long as the green indicating light G maintains a brilliancy equal to or greater than that of the red light R, it has been found that any critical amount of leakage $r$ will cause the green light G to become substantially invisible and the red light R will always be materially brighter indicating the dangerous condition when both lights are visible then the operators knows that it is safe to close the switch 25 of Fig. 2 and use the line thus protected by the indicating circuit. When the switch 25 is closed the red light is of course shunted thereby and goes out. The green light G then burns with full brilliancy owing to the fact that it has full voltage thereacross. Of course, if the red light does not glow before the switch 25 is closed it indicates that there is something wrong with the light or the indicating circuit requiring inspection. On the other hand, if the switch 25 is closed and the green light is out it is an indication that there is something wrong with the green circuit. Again, if the switch 25 is open and only one light shows, regardless of which it is, the circuit should be checked to determine the cause of the failure and whether or not it is a burned out light or a leakage creating such a condition. It is not likely that the indicating lights can be readily burned out as they are operated at voltages considerably lower than their normal rating which results in a materially long life in service.

Fig. 4 illustrates the indicating system as shown in Figs. 1 and 2 as applied to a plurality of sections along a single feeder line wherein it is desirable to employ the switches 25a, 25b, 25c, and 25d for the purpose of segregating a portion or portions of this feeder circuit owing to its length. A similar circuit as shown in Fig. 2 is employed for this purpose. However, it is desirable to add the push button that is arranged to connect the resistance $Rx$ in multiple with the resistance $R_1$ and the red light R. The resistance $Rx$ is selected so that each section of the circuit may be checked independently with all of the indicating lamps burning on the feeder circuit. The additional resistance $Rx$ in multiple with the resistance $R_1$ and the red light R compensates for all of the open switches 25a, 25b, 25c and 25d with the indicating and/or fixed lamp loads on this feeder circuit. If, however, this line is checked from the load end when all of the switches 25a, 25b, 25c and 25d are closed then it is only necessary to check each feeder circuit section progressively from the load end of the circuit as represented by the switch 25d and each switch is progressively left open as the checker proceeds toward the supply source utilizing the compensating resistance $Rx$ in accordance with the lamp loads in each previous section.

The governmental rules require grounding by a separate conductor of all electric motor frames in a mine and also the casing of any control devices or other electrical enclosures for the purpose of reducing the shock and fire hazard. Where mobile or portable tools are employed it follows that the frames must be grounded by means of an extra conductor in the cable which supplied the current to the machine or mobile unit. This extra conductor adds material weight, bulk and to the cost of the equipment and under certain conditions in mining applications this extra ground conductor can create hazards which are materially worse than the hazard of shock on the equipment which it is intended to cure.

The inherent features of the leak detector circuit previously described can be applied to improve upon the grounding practice of either stationary or portable electric equipment in as much as this circuit is designed to check the motor circuit for leakage currents before the power is actually applied to operate the apparatus. Thus, if the leakage can be detected before the power is applied to the equipment the leakage resistance to ground will show up long before it reaches the danger point. Thus, the leakage detector equipment will indicate a faulty machine or circuit long before it reaches the point where it may become injurious to the operator or other person thereby providing the greatest degree of safety in the operation of equipment.

An illustration of the machine connecting the power driven unit is shown in Fig. 5 where the electric motor M is indicated as being a portion of the mobile equipment indicated by the frame F and such motor is started and stopped by the switch 37 which connects the positive conductor 38 of the cable to the motor, the other side of the motor being directly connected to the negative conductor 39 and the frame F being connected by means of a grounding conductor 40. Thus, the cable contains the three conductors 38, 39 and 40 and may extend for a considerable distance from the feeder tap as illustrated by the positive line 20 and the negative line 21 wherein the positive conductor 38 of the cable is connected through the fuse 41 to the positive line 20 and the negative and grounding conductors 39 and 40 are directly connected to the negative conductor 21 which is grounded as indicated. This is an ordinary circuit employed in feeding direct current to a machine such as a coal cutter, a loading machine, a shuttle car, or any other similar mobile power unit that requires the use of a trailing cable for the purpose of supplying power thereto as it leaves the butt entry to work considerable distance in a room or at the face of the coal being mined.

The motor M is started by the switch 37 that is manually operated by a push button or other control and which connects the motor across the positive and negative conductors. Of course, the casing in the motor and all the equipment of the machine are integrally connected with the frame F of the machine which is grounded by the conductor 40 and the only protection for this motor is the fuse 41 which is ordinarily employed in a fused tap that hangs on or is otherwise connected to the trolley line of the butt entry. If a leakage to ground occurs in the machine or along the positive conductor 38 of the cable, the fuse 41 will not interrupt the circuit unless this leakage is equivalent to a high overload amounting to a short circuit. In other words, the leakage may draw a current as high as the power requirements for the motor before the fuse will provide any protection whatsoever and even though there are two conductors to ground invariably a severe leakage will produce shock from the machine frame F to ground. It should also be pointed out that the use of a double conductor ground such as indicated at 39 and 40 merely multiplies the chances for failure in the system as the machine will continue to function in a normal manner even though the grounding conductor 40 is severed. In any event, the operator has no way of knowing whether or not the equipment has a leakage that may eventually prove to be dangerous and the machine is continued in operation owing to the fact that it will still run, although at less efficiency.

The indicating system may be applied to the mobile unit as illustrated in Fig. 6 where the cable consists of the positive conductor 42 and the negative conductor 43 and the motor M is not grounded or otherwise connected with the frame F of the machine. The frame F thereby becomes a neutral body and may or may not have a direct connection to the earth depending upon whether or not the machine or any part thereof touches the ground or is provided with a ground chain. However, a ground chain, such as illustrated at 44, may be employed on the frame of the machine if the machine is carried by pneumatic tires and is ordinarily insulated from the ground. The red and green indicating lights R and G and the resistor $R_1$ are connected to the circuit in the same manner as that illustrated in Fig. 2. However, this equipment, rather than protecting a feeder line, is installed in a control box, one end of which is arranged to be connected to the feeder lines 20 and 21 by means of the wires 46 and 47 respectively and the other end is arranged to receive the double plug at the end of the cable comprising the conductors 42 and 43. The red and green indicating lamps R and G may be mounted in this control box so as to be visible from the outside thereof.

The principle of the leakage indicator and protective system as illustrated in Fig. 6 is extended to function as a control equipment. In place of employing the single switch 25 for the protection of a feeder circuit, as in Fig. 2, this controller is provided with a double pole magnetically operated line switch, the operating coil of which is indicated at L which is arranged to function in closing the two contactors $L_1$ and $L_2$. The former is arranged to connect the conductors 42 and 46 through the overload relay OL and the latter is arranged to connect the conductors 43 and 47 through the operating coil of the holding relay D. The circuit, from the conductor 42 through the overload relay, is connected to the line 48 and the conductor 43 is connected through the holding relay D to the line 49. Thus, the conductors 46 and 47 represent the line side of the control equipment and the conductors 48 and 49 represent the load side of the control equipment. The three resistors $R_1$, $R_2$, and $R_3$ are connected across the lines 46, 48, 49 and 47 to provide a gradient potential therebetween, the resistance $R_1$ being connected between the conductors 46 and 48 and in multiple with the red light R, the resistance $R_2$ being connected between the lines 48 and 49 and the resistance $R_3$ being connected between the lines 49 and 47, the green light being in multiple with the resistors $R_2$ and $R_3$ when considered as being connected in series between lines 48 and 47.

The two pole contactor with its operating coil L is employed to replace the fuse 41 of Fig. 5 and the contact or switch $L_1$ interrupts the positive side of the circuit whereas the contact $L_2$ interrupts the negative side of the circuit. The two resistors $R_2$ and $R_3$ are selected to provide a definite potential gradient between the lines 48, 49 and 47.

A measuring relay having an operating coil A is connected in series with the back contact $L_3$ of the contactor L and both are placed in multiple with the green light G or between the lines 48 and 47. If the resistance between the conductors 42 and 43 of the cable or between the load lines 48 and 49 falls below a predetermined minimum value the potential across the green light G or the measuring relay A will not be sufficient to light the light or to energize this relay and close its front contact $A_1$ which is in the circuit of the operating coil B, a control relay that is connected in series with the resistance $R_4$ and the front contact $A_1$ of the measuring relay both of which are connected across the lines 49 and 47 or in multiple with the resistor $R_3$.

The operating coil B of the control relay can only be energized when the front contact $A_1$ of the measuring relay A is closed. Thus, the contact $A_1$ of the measuring relay A, which closes only when the leakage resistance $r$ is sufficiently high to indicate that there is no fault in the circuit, provides a positive control as well as a proper indication that may be observed from the green lamp G.

The control relay B is calibrated in such a manner that it will not close its front contact $B_1$ when the switch 37 of the equipment that controls the motor M is open. However, when the switch 37 is closed to start the motor M the potential across the operating coil B of the control relay is increased sufficiently to energize this relay and close its front contact $B_1$ which is in series with the contactor operating coil L and also provided there is no leakage between lines 43 and 47. The resistor $R_4$ is inserted in the circuit of the control relay coil B to provide the correct voltage drop in the circuit, preventing this relay from functioning only when the switch 37 is closed. The front contact $B_1$ of the control relay initiates the energization of the operating coil L through the back contact $OL_1$ of the overload relay and when energized the contacts $L_1$ and $L_2$ close connecting the load circuit to the line.

In order to place the resistance measuring feature in readiness for each successive operation of the machines the coils A and B of the measuring and controlling relays are deenergized by an auxiliary back contact $L_3$ of the main contactor which contact is in series with the operating coil A of the measuring relay and when the latter becomes deenergized its front contact $A_1$ opens the circuit of the operating circuit B of the control relay. Also, the closing of the contact $L_2$ bridges the circuit of the control relay B deenergizing the same.

In order to provide a holding circuit for the operating coil L of the line contactor a holding relay is employed, the operating coil D of which is placed in series with the negative or return conductor 43. After the control relay B energizes the operating coil L of the line contactor to close the contacts $L_1$ and $L_2$ the current supplied to the motor M is sufficient to cause the holding relay D to function and its front contact $D_1$ maintains the operating coil L of the line contactor in its energized position. There is a sufficient time delay in the opening of the contacts of the measuring relay A and the control relay B to permit the holding relay D to pick up and maintain the holding circuit for the operating coil L. When the switch 37 is opened to stop the motor M the relay D becomes deenergized and it in turn deenergizes the contactor L.

In order to maintain a consistent operation of the measuring relay A and the control relay B independently of the line voltage fluctuations, these relays are provided with differential coils indicated at A$d$ and B$d$ which differential coils are connected in series and in multiple with the resistance $R_1$ between the lines 46 and 48. The differential coils A$d$ and B$d$ are wound and positioned to counteract the fluctuation of voltage on the main operating coils A and B of these relays. Since the differential coils A$d$ and B$d$ are connected across the fixed resistance $R_1$ the effect of these coils varies only with the line voltage fluctuations and thereby equally affect the operating coils A and B to function properly regardless of line voltage fluctuation. The relays will therefore function with fixed predetermined variation of voltage between the lines 48 and 47 and lines 46 and 47.

When the cable servicing the mining equipment is provided with the indicating and protective circuit as disclosed in Fig. 6, which equipment is preferably integrally connected with the line end of the cable, the operator merely connects the two lines 46 and 47 to the positive and negative feeders in the butt entry and anchors the control equipment in any suitable manner. He is then ready to proceed from the butt entry into the room or other part of the mine. When this connection is made the lights will properly indicate whether or not there is a serious leakage resistance $r$ in the cables or equipment circuit and if this resistance is relatively high the relay A will immediately become energized and close its contact $A_1$ setting the circuit in readiness for the functioning of the control relay B. If, on the other hand, the leakage resistance $r$ is too low the measuring relay A will not have sufficient energy to close its contact and thereby prevent the operator from using the machine. Under such circumstances, the green light will be substantially invisible and the red light will be bright. Assuming that the leakage resistance of the circuit is sufficiently high to permit the measuring relay A to function and provide energization of the machine, and it is desired to start the motor M, the switch 37 is then closed which will not immediately cause the motor to function but will supply a sufficient current through the circuit to energize the control relay B. When the relay B is energized its contact $B_1$ will then permit the operating coil L of the line contactor to function causing the contactors $L_1$ and $L_2$ to close and the back contact $L_3$ of this contactor will open the circuit through the measuring relay A. As soon as current flows through the line contactors $L_1$ and $L_2$ and through the motor M the current is sufficient to energize the holding relay D which closes its contact $D_1$ and provides a holding circuit for the operating coil L of the contact.

The overload relay OL is maintained in the circuit of the conductor 42 of the cable and if too much energy is drawn through the circuit by the motor indicating that there may be a fault, such as a short, the series overload relay OL will open its contact and interrupt the holding circuit through the operating coil L thereby disconnecting the motor M from the source of current supply.

In the structure shown in Fig. 7 the mining equipment is provided with the switch 37 on the positive side of the cable 42 and the switch 50 on the negative side of the motor circuit. It is therefore necessary to close both switches 37 and 50 for the purpose of operating the motor M. It will also be noted that the line side of the switch 50 is connected by means of the wire 51 to the frame F for the purpose of directly grounding the frame to the operating circuit or the cable conductor 43. The control circuit of Fig. 7 is the same as that shown in Fig. 6 with the exception of the control relay B, which formerly was operated in series with the resistance $R_4$ which now becomes a series or current relay in Fig. 7 in place of a potential relay as shown in Fig. 6 as the resistance $R_4$ has been eliminated. However, the function and operation of this circuit is precisely the same as that disclosed and described with reference to Fig. 6. Such a circuit, as illustrated in Fig. 7, can be employed for use with a pneumatically tired shuttle car which ordinarily is not provided with any ground. In this circuit normally the motor M would normally be operated by the switch 50. However, if a ground develops the motor may be interrupted by opening the emergency switch 37. Even though the relay B is a low resistance high current relay it will not function unless and until both switches 37 and 50 controlling the motor M are closed.

Figs. 8 and 9 illustrate by circuit diagram how the leakage indicator and protective circuit may be applied to a semi-stationary equipment for operating motors or other similar devices receiving their power through a trailing cable such as ordinarily employed for conveyor units in a mine. The control relay B, together with the holding relay D, have been eliminated and this equipment is energized remotely by push button control. However, the balance of the circuit is the same as that previously described with reference to Fig. 6. Since the control relay B and the holding relay D have been omitted it is necessary to supply a start and stop push button arrangement such as illustrated at 52 and 53 in the circuit of the operating coil L of the controller as shown in Figs. 8 and 9. In this instance the controller L is provided with the two front contacts $L_1$ and $L_2$ for the purpose of connecting the cable or cables to the source of power and an additional front holding contact $L_4$ which maintains the holding circuit of the operating coil L. The back contact $L_3$ interrupts the circuit of the measuring relay A as before. The starting push button 52 is placed in series with the front contact $A_1$ of the measuring relay and the stop push button 53 is placed in series with the front contact $L_4$ of the controller. The latter two contacts are placed in multiple with the former contacts and the same is in series with the overload relay contact or contacts $OL_1$ and the operating coil L of the controller.

When the conductors 46 and 47 are connected to the respective supply lines 20 and 21 both the red and green lights R and G will glow and if the leakage current between the conductors 42 and 43 of the cable and between the circuit and the frame of the machine represents a high resistance, relay coil A will be supplied with a sufficient amount of current to energize the same and to close its contact A₁. In view of the fact that there is no current flowing through the cable or the machine the overload relay will of course not function and its back contact OL₁ will remain closed.

Upon depressing the starting push button 52 in Fig. 8, current is permitted to flow from the conductor 46 through the push button, the front contact A₁, the back contact OL₁, the operating coil L of the controller, to the conductor 47 thereby energizing the controller and causing the front contacts L₁ and L₂ to close. Upon the energization of the controller the front contact L₄ closes and permits the current to flow through the normally closed stop push button 53, the front contact L₄, the normally closed back contact OL₁, and the operating coil L thereby setting up a holding circuit for maintaining energization of the controller. At the same time a back contact L₃ deenergizes the measuring relay A opening the front contact A₁ there being a sufficient time delay to establish the holding circuit. The closing of the front contacts L₁ and L₂ of the controller thereby directly energizes the conductors 42 and 43 of the cable. However, the motor M will not function until and unless the control switch 37 is closed. The switch 37 is normally closed but may be opened or closed without disturbing the holding circuit of the contactor which can only be deenergized by depressing the stop push button 53 or by the function of the overload relay. This type of circuit is ordinarily used with the switch 37 in its closed position and the push buttons 52 and 53 may be located within the indicator and protective unit or they may be remote of this position. However, the complete circuit of the cable and the motor or other electrical device that is energized on the equipment is checked for leakage resistance before the circuit is permitted to close and supply electrical energy to the cable conductors 42 and 43.

The circuit diagram of Fig. 9 illustrates the application of the indicator and protective circuits shown in Fig. 8 as applied to a plurality of independent machines or to a plurality of motors of a single machine which are preferably operated remotely by the start and stop push buttons 52 and 53. It will be noted that each motor is provided with its own cable conductors namely 42a, 43a for the motor Ma and 42b and 43b for the motor Mb and 42c and 43c for the motor Mc and these conductor cables are provided with their separate overload relays OLa, OLb and OLc, as indicated. However, the overload relay OL as shown in Fig. 8 is also employed adjacent the contactor L₁. The back contact of each of these overload relays are connected in series with the operating coil L and the start and stop push buttons 52 and 53 as illustrated in the drawing at OL₁, OLa₁, OLb₁ and OLc₁. With this circuit each of the three motors Ma, Mb and Mc may be started by the push button 52 and stopped by the push button 53 or they may be individually stopped or started when the push button 52 has made the holding circuit through the front contact L₄ by means of their independent switches 37a, 37b and 37c.

If the control circuits previously described thus measure the leakage resistance and if this resistance is too low and is approaching a dangerous condition the indicators will display a red light and it will become impossible to energize the circuit through the equipment. In other words, the leakage resistance is actually measured by the measuring relay A. If the leakage resistance is sufficiently high the measuring relay A will function, but if the leakage resistance is low the relay will not function and it will prevent the equipment from being energized. Although in each instance the indicating lamps R and G are shown their omission in these protective circuits would not in any way change the effectiveness of the function of the measuring relay. They are provided to furnish a visual indication of the condition of the circuit and as soon as the controller is closed of course the red light R is extinguished and the green light G glows with full brilliancy. Any one that is near or within sight of the control equipment that is adjacent the feeder lines along the butt entries can see at a glance whether or not the equipment that is within the room is energized and functioning or deenergized. Therefore, the red and green lights of this equipment provide a remote indication of the condition of operation of the machinery in the mine rooms.

The term "feeder," as employed in the description and claims, is defined as part of the direct current grounded return distribution circuit on the load side of a sectionalizing switch and includes main feeders, branch feeders, unit feeders for stationary equipment, or trailing cable circuits to separate mobile mining machinery, the latter of which may be supplied from a main or branch feeder.

The term "power source," as used in the description and claims, is defined as the energized side of a sectionalizing switch in the circuit of a "feeder" previously defined.

I claim:

1. An electrical detector protective system for direct current ground return circuits, comprising a line for supplying positive potential from a source of supply, a ground return, a feeder, feeder switch means connected at one end to said line and connected at its other end to said feeder to supply positive potential to a load connected between the feeder and the ground return when the feeder switch means is closed, a detector resistance means having an intermediate and two end terminals, one of said end terminals connected to the line side of said switch means, the other end terminal connected to the ground return and the intermediate terminal connected to the feeder side of said feeder switch means, the resistance from the intermediate terminal to the line side of the feeder switch means being selected to approximate the permissible leakage from the feeder to the ground return.

2. The structure of claim 1 characterized in that said detector resistance means includes a lamp between each of two of its terminals for visual indication.

3. The structure of claim 1 characterized in that said detector resistance means has equivalent resistances between its intermediate terminal and each of two of its end terminals.

4. The structure of claim 1 characterized in that said detector resistance means includes a lamp connected in multiple with a resistance between the intermediate terminal and the terminal connected to said line, and a lamp connected between the intermediate terminal and the terminal connected to ground.

5. The structure of claim 1 characterized in that said detector resistance means includes a lamp connected in multiple with a resistance between the intermediate terminal and the terminal connected to said line, a second resistance connected in parallel with said lamp and having a switch in series therewith, and a lamp connected between the intermediate terminal and the terminal connected to ground.

6. The structure of claim 1 characterized in that said feeder switch means includes a contactor having three front and one back contact with a front contact on each side of the load and its operating switch and connecting the operating coil of a single back contact overload relay in series from the line to the ground return, and which also includes an operating coil of a single front contact measuring relay in series with the back contact of said contactor and connected from said intermediate terminal to said ground return, a starting and stopping pushbutton, the single front contact of said measuring relay connected in series with the starting pushbutton and the back contact of the overload relay and the operating coil of said contactor all of which are connected from the line to the ground return, and a front contact of said contactor connected in series with the stop pushbutton and in multiple with said single front contact of said measuring relay and said starting pushbutton.

7. The structure of claim 1 characterized in that said feeder switch means includes a contactor having two front and one back contact with a front contact on each side of the load and its operating switch and connecting the operating coils of a single front contact holding relay and a single back contact overload relay in series from the line to the ground return, and which also includes an operating coil of a single front contact measuring relay in series with the back contact of said contactor and connected from said intermediate terminal to said ground return, the single front contact of said measuring relay connected in series with the operating coil of a single front contact control relay and connected in multiple with the front contact of the contactor on the ground reurn side of the load, the front contact of the control relay connected in series with a back contact of the overload relay and the operating coil of the contactor which are connected from the line to ground return, and the front contact of said holding relay connected in multiple with the front contact of said control relay.

8. The structure of claim 7 which also includes a differential voltage coil on the measuring relay and the control relay both of which are connected in series and between the line and said intermediate terminal.

9. The structure of claim 7 wherein said operating switch includes an operating switch on each side of the load and immediately adjacent thereto, the load being grounded to the ground return side of the load outside of the operating switch.

FRED J. BUCHER.

REFERENCES CITED

The following references are of record in the file of this patent:

UNITED STATES PATENTS

| Number | Name | Date |
|---|---|---|
| 396,582 | Loomis | Jan. 22, 1889 |
| 1,300,546 | Armstrong | Apr. 15, 1919 |
| 2,010,701 | Richardson | Aug. 6, 1935 |
| 2,131,386 | Mishelevich | Sept. 27, 1938 |
| 2,376,658 | Charbonneau et al. | May 22, 1945 |
| 2,382,647 | McLoughlin et al. | Aug. 14, 1945 |

FOREIGN PATENTS

| Number | Country | Date |
|---|---|---|
| 289,538 | Great Britain | Apr. 30, 1928 |